(12) United States Patent
Pasko et al.

(10) Patent No.: US 7,990,969 B2
(45) Date of Patent: Aug. 2, 2011

(54) MULTIPROTOCOL LABEL SWITCHING (MPLS) INTERFACE WITH VIRTUAL PRIVATE NETWORK (VPN) APPLICATION

(75) Inventors: Douglas M. Pasko, Bedminster, NJ (US); Oleg Berzin, Frazer, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 320 days.

(21) Appl. No.: 11/767,029

(22) Filed: Jun. 22, 2007

(65) Prior Publication Data

US 2008/0317038 A1   Dec. 25, 2008

(51) Int. Cl.
   *H04L 12/56*   (2006.01)
(52) U.S. Cl. ........................................................ 370/392
(58) Field of Classification Search ..................... None
   See application file for complete search history.

(56) References Cited

U.S. PATENT DOCUMENTS

| | | | | |
|---|---|---|---|---|
| 6,895,425 | B1 * | 5/2005 | Kadyk et al. ................... | 709/203 |
| 7,046,669 | B1 * | 5/2006 | Mauger et al. ................. | 370/393 |
| 2005/0185647 | A1 * | 8/2005 | Rao et al. ........................ | 370/392 |
| 2006/0029104 | A1 * | 2/2006 | Jungck ............................ | 370/498 |
| 2007/0110043 | A1 * | 5/2007 | Girard ............................. | 370/352 |
| 2007/0133528 | A1 * | 6/2007 | Jin et al. ......................... | 370/389 |
| 2007/0140250 | A1 * | 6/2007 | McAllister et al. ........... | 370/392 |
| 2008/0043764 | A1 * | 2/2008 | Ishizaki et al. ................ | 370/401 |
| 2008/0137541 | A1 * | 6/2008 | Agarwal et al. ............... | 370/241 |

OTHER PUBLICATIONS

Gyu Myoung Lee, et al, "A Study of Flow-based Traffic Admission Control Algorithm in the ATM-based MPLS Network", IEEE 2001.

* cited by examiner

*Primary Examiner* — Chirag G Shah
*Assistant Examiner* — Amarnauth Persaud

(57) ABSTRACT

A method comprising receiving, from a first node, a first packet at a network application server via a first local area network (LAN); receiving, from a second node, a second packet at the network application server via a second LAN; associating the first packet with a first VPN based on receiving the first packet via the first LAN; and associating the second packet with a second VPN based on reception of the second packet via the second LAN, wherein the first VPN and the second VPN include overlapping network address spaces.

25 Claims, 10 Drawing Sheets

1000

MULTIPROTOCOL LABEL SWITCHING (MPLS) INTERFACE WITH VIRTUAL PRIVATE NETWORK (VPN) APPLICATION

BACKGROUND INFORMATION

Network providers may offer virtual private networks (VPNs) to their customers. Using a VPN, a customer may be able to communicate confidential information over a public or shared network. A network provider may implement a VPN over a private network using MultiProtocol Label Switching (MPLS). MPLS is a data-carrying protocol that may provide the features of a circuit-switched network over a packet-switched network. MPLS may carry many different kinds of traffic, including internet protocol (IP) packets, as well as asynchronous transfer mode (ATM), synchronous optical network (SONET), and Ethernet frames.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments disclosed herein may provide for network application services, such as application acceleration, to be provided to groups of VPNs where the VPNs have overlapping address spaces. Despite overlapping address spaces, embodiments disclosed herein may associate packets and flows of packets with VPNs based on the local area network (LAN) or virtual LAN (VLAN) on which the packets were received, for example.

Figure 1:
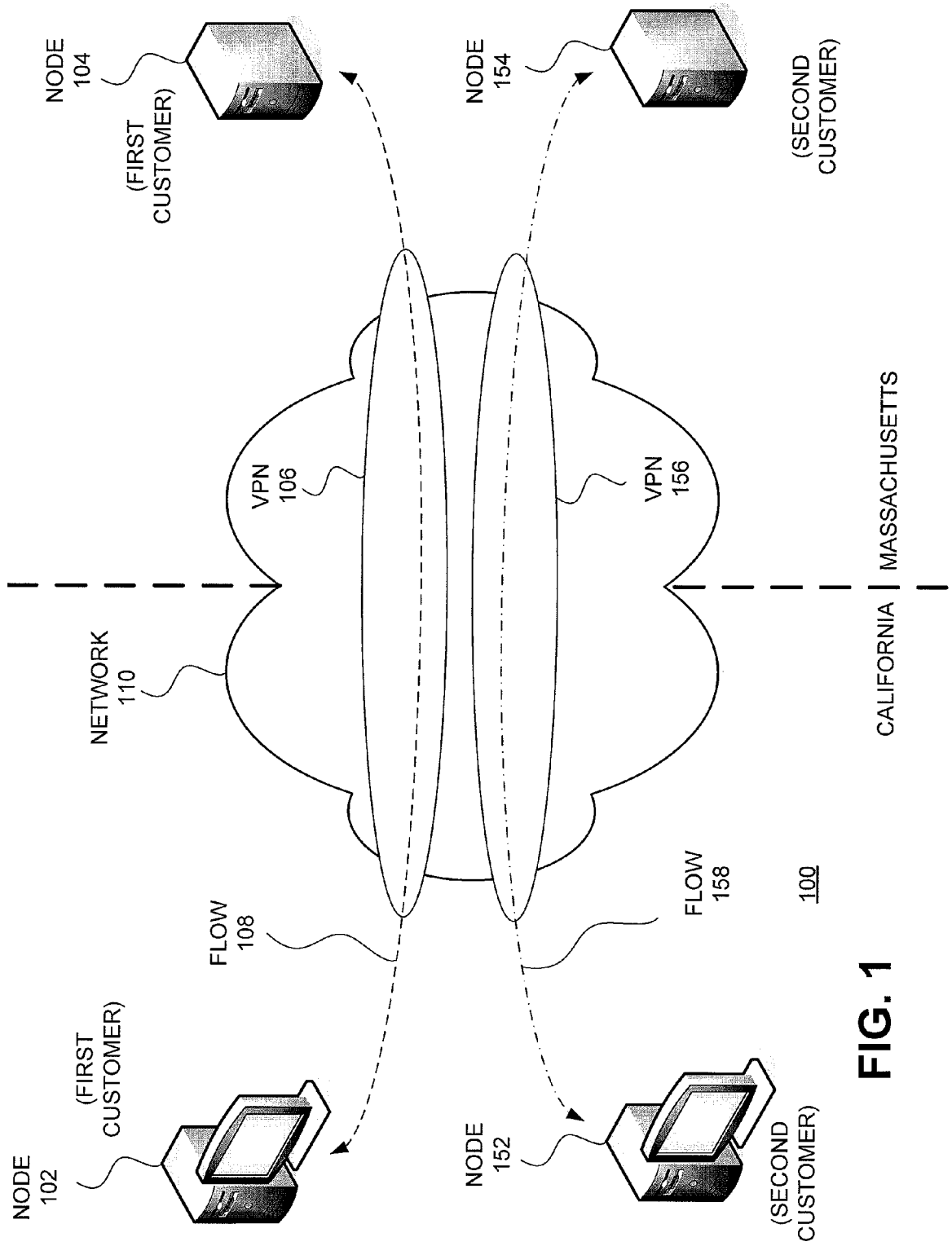
FIG. 1 is a block diagram of an exemplary environment in which embodiments described herein may be implemented.

FIG. 1 is a block diagram of an exemplary environment 100 in which embodiments described herein may be implemented. Environment 100 may include nodes 102, 104, 152, and 154, a network 110, virtual private networks (VPNs) 106 and 156, and data flows 108 and 158. Node 102 and node 104 may be connected by VPN 106 through network 110 for the passage of flow 108, for example. Node 152 and node 154 may be connected by VPN 156 through network 110 for the passage of flow 158, for example. The number of elements illustrated in FIG. 1 is provided for simplicity. Environment 100 may include additional, fewer, or different elements, that may be arranged in different configurations.

VPNs 106 and 156 may be provided to customers by a network service provider, for example. Data traffic over VPN 106 may be kept separate (logically and/or physically) from other traffic, such as data traffic transmitted via VPN 156. Likewise, data traffic over VPN 156 may be kept separate (logically and/or physically) from other traffic, such as data transmitted via VPN 106. In other words, VPNs 106 and 156 may each be considered a dedicated private communication service. Despite this separation, however, data traffic over VPN 106 and data traffic over VPN 156 may nonetheless share some physical resources, such as routers, transmission lines, processors, etc., that may be included in network 110. Conceptually, VPN 106 may be thought of as including nodes 102 and 104. Likewise, VPN 156 may be though of as including nodes 152 and 154.

In exemplary environment 100, nodes 102 and 104 may be associated with a first customer and nodes 152 and 154 may be associated with a second customer. First and second customers may include, for example, different companies. In this example, nodes 102 and 104 may be associated with VPN 106 between the first customer's remote offices. Nodes 152 and 154 may be associated with VPN 156 between the second customer's remote offices. For example, in exemplary environment 100, nodes 102 and 152 may be located in California, for example, which may be considered remote from nodes 104 and 154, which may be located in Massachusetts.

Node 102 may communicate with node 104 using flow 108, for example. Flow 108 may include a lasting connection between node 102 and node 104 that may, for example, involve the exchange of many packets between node 102 and node 104. Node 152 may communicate with node 154 using flow 158, for example. Flow 158 may include a lasting connection between node 152 and node 154 that may, for example, involve the exchange of many packets between node 102 and node 104.

Node 102 may include a personal computer (PC); a workstation; a laptop; a server; a mobile telephone; a portable communications device; a telephone, such as land-line telephone or a radio telephone; a personal communications system (PCS) terminal that may combine cellular radiotelephone with data processing, facsimile, and/or data communications capabilities; an electronic notepad; a personal music player (PMP); a personal digital assistant (PDA) that can include a radiotelephone, pager, Internet/intranet access, web browser, organizer, calendar, and a global positioning system (GPS); or another type of computation or communication device. Node 102 may be part of a local area network (LAN) or a wide-area network (WAN) that include other nodes (not shown). Node 102 may include customer premise equipment (CPE), including time-division multiplexing (TDM) circuits, a telephone system (e.g., a private branch exchange (PBX), a voice over Internet protocol (VoIP) system), one or more servers, or one or more routers.

Node 102 may transmit data to and receive data from network 110 and other nodes via any number of protocols, such as Ethernet, Frame Relay, asynchronous transfer mode (ATM), time division multiplexing (TDM), Internet protocol (IP), etc. Node 102 may communicate with network 110 via any type of wired and/or wireless communication connections, including a public switched telephone network (PSTN) or a mobile telephone network.

Nodes 104, 152, and 154 may include any of the devices described above with respect to node 102 and may operate similarly to node 102.

Network 110 may include one or more sub-networks of any type, including a LAN, a WAN, a satellite network, a MAN, a telephone network, such as the PSTN or a Public Land Mobile Network (PLMN), an intranet, the Internet, or a combination of networks. The PLMN(s) may further include a packet-switched sub-network, such as, for example, General Packet Radio Service (GPRS), Cellular Digital Packet Data (CDPD), or Mobile IP sub-network.

Network 110 may represent a network used to route customer traffic to/from various devices in environment 100, such as nodes 102, 104, 152, and 154. Network 110 may include devices, systems, and/or protocols that provide switching of packets, such as MPLS devices, systems, and protocols. Network 110 may include VPNs, such as VPNs 106 and 156.

Figure 2:
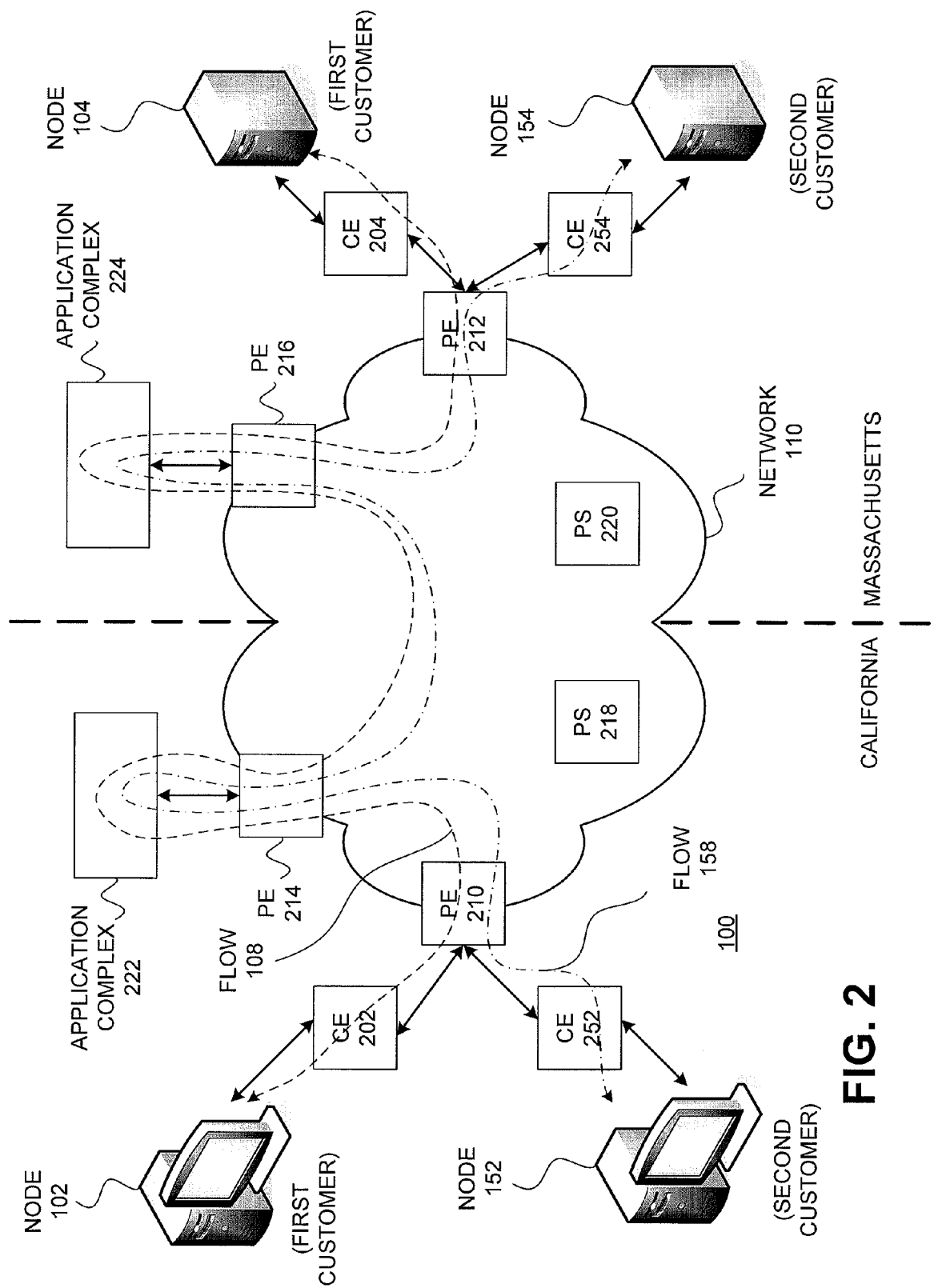
FIG. 2 is a more detailed block diagram of the exemplary environment of FIG. 1 in which embodiments described herein may be implemented.

FIG. 2 is a more detailed block diagram of exemplary environment 100 in which embodiments described herein may be implemented. In addition to the elements shown in FIG. 1, environment 100 may include customer edge (CE) routers 202, 204, 252, and 254. Further, environment 100 may include provider edge (PE) routers 210, 212, 214, and 216. In addition, environment 100 may include provider switch (PS) routers 218 and 220, and application complexes 222 and 224.

CE routers 202, 204, 252, and 254 may include routers located on customer premises. For example CE router 202 may be located at the premises of the first customer in California. CE router 204 may be located at the premises of the first customer in Massachusetts. CE router 252 may be located at the premises of the second customer in California. CE router 254 may be located at the premises of the second customer in Massachusetts. CE routers 202 and 252 may provide a data path from node 102 and 152, respectively, to PE router 210. CE routers 204 and 254 may provide a path from node 104 and 154, respectively, to PE router 212. In one embodiment, CE routers 202, 204, 252, and 254 are IP routers that may receive IP packets and forward IP packets to PE routers 210 and 212.

PE routers 210, 212, 214, and 216 may include routers that provide an entry and/or an exit to and from network 110. PE routers 210, 212, 214, and 216 may convert a packet that enters network 110 into a MPLS packet, by adding a MPLS header to the packet. PE routers 210, 212, 214, and 216 may also convert a MPLS packet to a native packet, e.g., a non-MPLS packet, by stripping away its MPLS header.

PS routers 218 and 220 may include routers that accept packets, such as MPLS packets, and route packets, such as MPLS packets, toward destination devices. In one embodiment, the nodes attached to VPN 106, e.g., nodes 102 and 104, may have native network addresses, such as IP addresses, and may send/receive IP packets. Likewise, nodes attached to VPN 156, e.g., nodes 152 and 154, may also have native network addresses, such as IP addresses, and may send/receive IP packets. As packets pass through network 110, however, the IP packets with IP source and destination addresses may be encapsulated in MPLS packets. As such, even though the nodes on VPN 106 and VPN 156 may have overlapping IP addresses, network 110 providing VPN services may keep packets on VPN 106 and/or VPN 156 logically and/or physically separate.

In addition to providing VPN 106 to the first customer and VPN 156 to the second customer, a network service provider may also offer network application services. Network 110 may provide network application services to nodes connected to network 110. One such network service may be the acceleration of applications running at the nodes and communicating via VPNs, such as VPNs 106 and 156. For example, node 102 may execute a client application that may communicate with a server application running at node 104. In this example, node 102 may include a payroll application that may communicate with an employee database application running in node 104. In this situation, VPN 106 may experience "chatter" between node 102 and node 104, including, for example, acknowledgment packets, etc., between payroll application in node 102 and employee database application in node 104. Such chatter may, for example, slow the performance of the payroll application in node 102 because of the geographical distance between node 102 (e.g., California), and node 104 (e.g., Massachusetts). Such large distances may cause high latency because of the time it may take for messages to travel.

Application complexes 222 and 224 may provide network service applications, such as application acceleration. Application complex 222, for example, may accelerate applications by caching data, responding to messages, etc. For example, after sending a message to node 104, node 102 may wait for an acknowledgment message (ACK) from node 104. Application complex 222 may intercept the message from node 102 to node 104 and application complex 222 (instead of node 104) may send the ACK message to node 102. Because application complex 222 may be geographically closer to node 102 than node 104, node 102 may not have to wait as long for the ACK message, thus speeding up the client application.

As indicated in FIG. 2, flow 108 may pass from node 102 through CE router 202 to PE router 210. Flow 108 may be sent from PE router 210 to PE router 214. From PE router 214, flow 108 may pass to application complex 222, which may be the application complex physically closest to node 102. Application complex 222 may perform network application services, such as application acceleration, associated with flow 108. Flow 108 may then pass from application complex 222, back through PE router 214 to network 110 toward the destination of node 104.

In the other direction, flow 108 may pass from node 104 through CE router 204 to PE router 212. Flow 108 may be sent from PE router 212 to PE router 216. From PE router 216, flow 108 may pass to application complex 224, which may be the application complex physically closest to node 104. Application complex 224 may perform network application services, such as application acceleration, associated with flow 108. Flow 108 may then pass from application complex 224, back through PE router 216 to network 110 toward the destination of node 102. In one embodiment, application complexes 222 and 224 may perform network application services associated with flow 108 in both directions.

As indicated in FIG. 2, flow 158 may pass from node 152 through CE router 252 to PE router 210. Flow 158 may be sent from PE router 210 to PE router 214. From PE router 214, flow 158 may pass to application complex 222, which may be the application complex physically closest to node 152. Application complex 222 may perform network application services, such as application acceleration, associated with flow 158. Flow 158 may then pass from application complex 222, back through PE router 214 to network 110 toward the destination of node 154.

In the other direction, flow 158 may pass from node 154 through CE router 254 to PE router 212. Flow 158 may be sent from PE router 212 to PE router 216. From PE router 216, flow 158 may pass to application complex 224, which may be the application complex physically closest to node 154. Application complex 224 may perform network application services, such as application acceleration, on flow 158. Flow 158 may then pass from application complex 224, back through PE router 216 to network 110 toward the destination of node 152. In one embodiment, application complexes 222 and 224 may perform network application services on flow 158 in both directions.

Application complexes 222 and 224 may operate in the same native network address space as nodes 102, 104, 152, and 154, such as an IP network address space. PE routers 214 and 216 may convert MPLS packets to native packets before sending the packets to application complexes 222 and 224. Conversely, PE routers 214 and 216 may convert, e.g., encapsulate, native packets into MPLS packets when receiving packets from application complexes 222 and 224 before sending them to nodes on VPNs in network 110.

Figure 3:
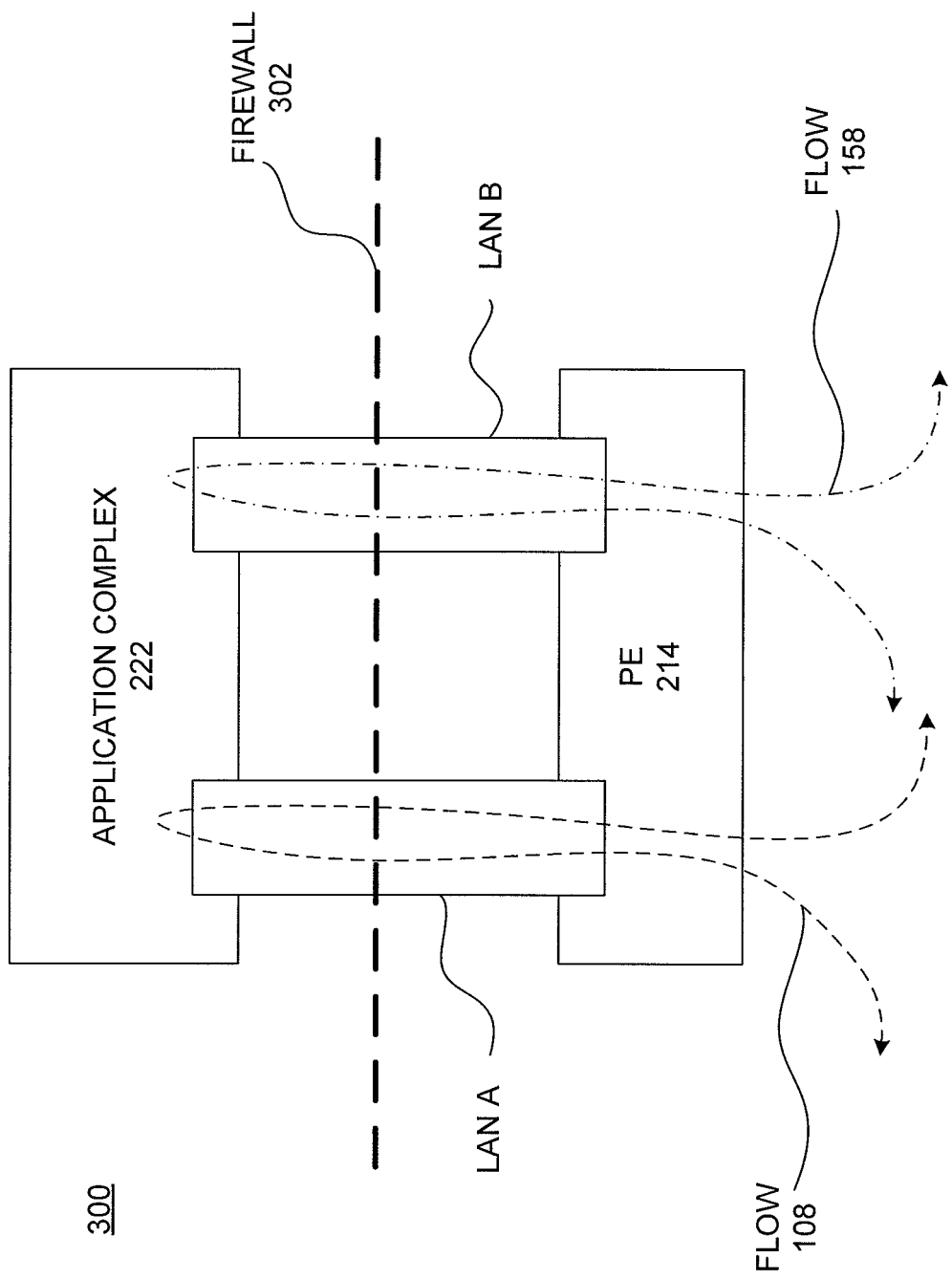
FIG. 3 is a block diagram of an exemplary coupling of a provider edge router with an application complex.

FIG. 3 is a block diagram of an exemplary coupling of PE router 214 with application complex 222. In addition to PE router 214, application complex 222, and flows 108 and 158, such a coupling may include a LAN A, a LAN B, and a firewall 302. As shown in FIG. 3, flow 108, which may be associated with VPN 106, may be passed through LAN A to application complex 222. Flow 158, which may be associated with VPN 156 may be passed through LAN B to application complex 222. Application complex 222 may associate traffic on LAN A with VPN 106 and may associate traffic on LAN B with VPN 156. In one embodiment, LAN A and LAN B may exist on separate physical ports in application complex 222 and/or PE router 214. In one embodiment, LAN A and LAN B may be virtual LANs (VLANs). Firewall 302 may check packet characteristics, such as destination address, source address, destination port, and source port, to remove or block unwanted packets.

In one embodiment, packets passing through LAN A and LAN B to application complex 222 may be native packets without MPLS headers. As such, flow 108 and flow 158 may include an overlapping network address space. In addition, VPN 106 and VPN 156 may include overlapping network address spaces. That is, a node in VPN 106 may have the same network address as a node in VPN 158.

Figure 4:
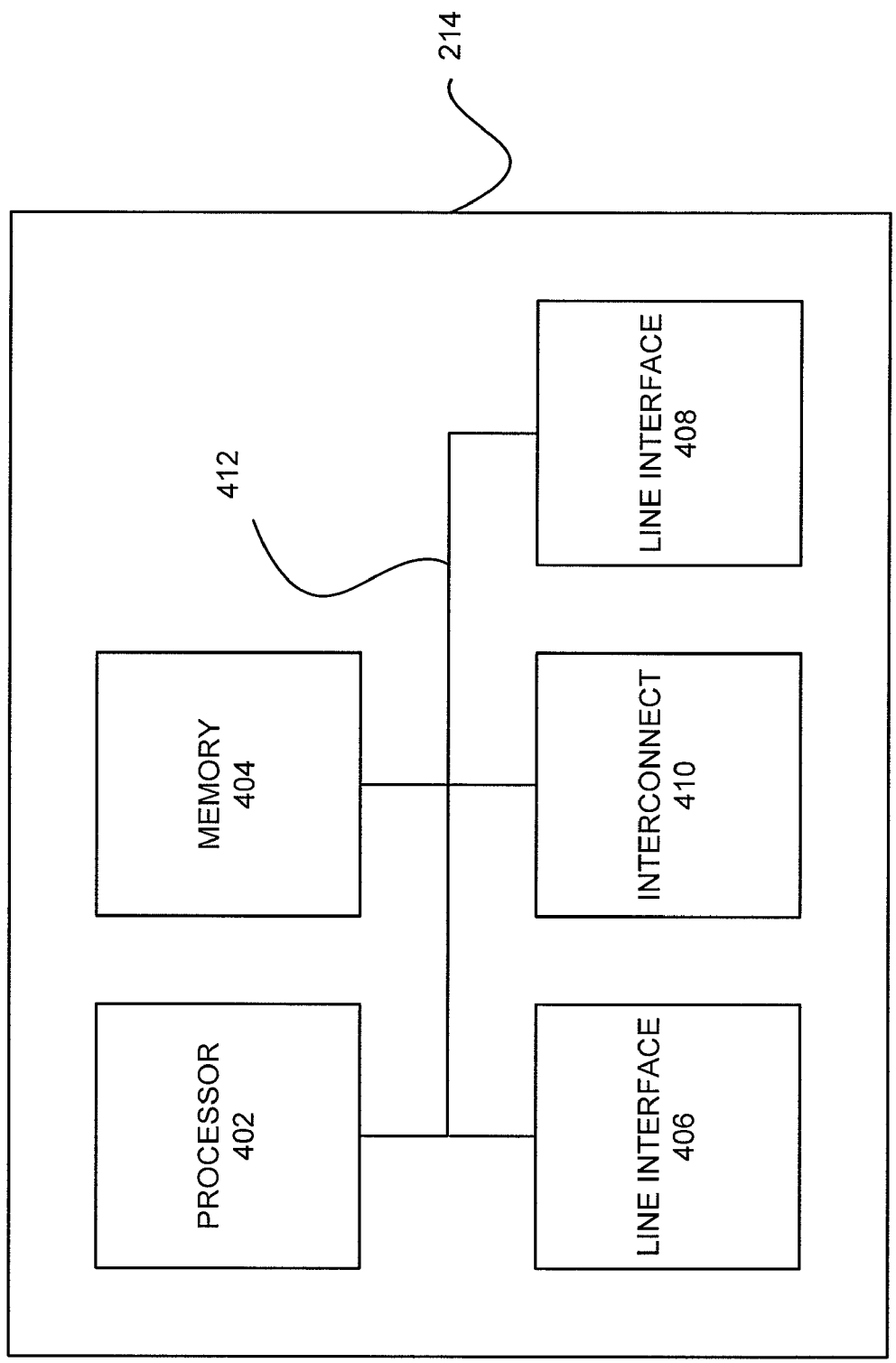
FIG. 4 illustrates an exemplary block diagram of the components of a provider edge router.

FIG. 4 illustrates an exemplary block diagram of components of PE router 214. PE routers 210, 212, and 216, and PS routers 218 and 220 may be similarly configured. PE router 214 may include a processor 402, a memory 404, line interfaces 406 and 408, an interconnect 410, and a bus 412.

Processor 402 may include one or more processors, microprocessors, application specific integrated circuits (ASICs), field programmable gate arrays (FPGAs), and/or processing logic for networking and communications. Processor 402 may process packets and/or network path-related information. Processor 402 may interpret and execute instructions stored in memory 404.

Memory 404 may include a random access memory (RAM) or another type of dynamic storage device that may store information and instructions for execution by processor 402; a read-only memory (ROM) device or another type of static storage device that may store static information and instructions for use by processor 402; and/or some other type of magnetic or optical recording medium and its corresponding drive, e.g., a hard disk drive (HDD), a floppy disk, a CD ROM, and/or flash memory, for storing information and/or instructions. Memory 404 may include data structures or software programs to control operation of application complex 222 and its components.

Line interfaces 406 and 408 may include devices for receiving incoming packets from networks and for transmitting packets to networks. Interconnect 410 may include one or more switches or switch fabrics for conveying an incoming packet from line interface 406 to line interface 408 based on a packet destination and stored path information. Bus 412 may include a path that permits communication among components of each of PE routers 214.

Figure 5:
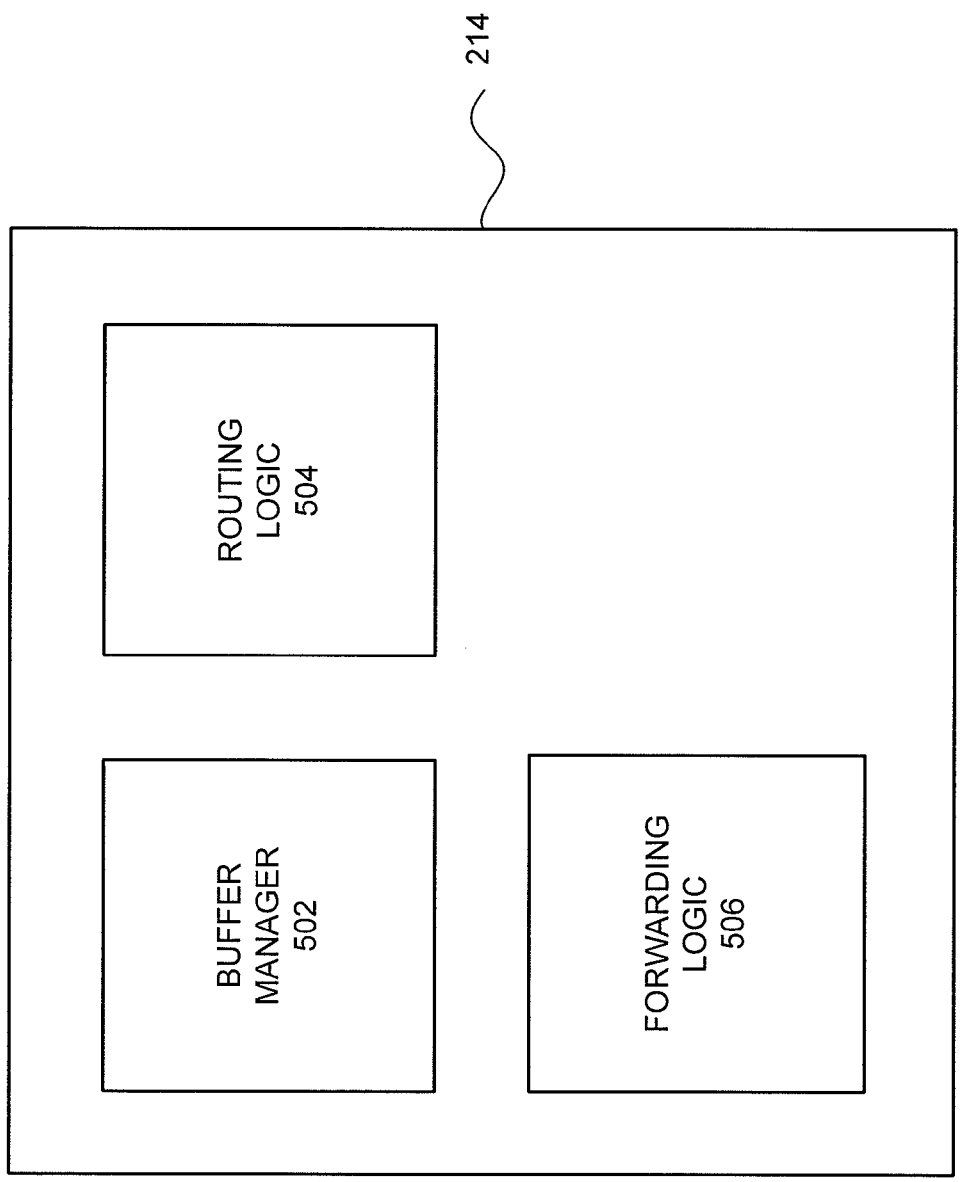
FIG. 5 is an exemplary functional block diagram of the components of a provider edge router.

FIG. 5 is an exemplary functional block diagram of components included in or implemented PE router 214. PE routers 210, 212, and 216 may be configured in a functionally similar manner as PE router 214. PE router 214 may include a buffer manager 502, routing logic 504, and forwarding logic 506. Buffer manager 502 may provide a buffer for queuing incoming packets. If packets arrive simultaneously, one or more of the packets may be stored in the buffer until higher priority packets are processed and/or transmitted. Forwarding logic 506 may include hardware and/or software for directing a packet to a proper output port on one of line interfaces 406 or 408 based on routing information. Routing logic 504 may include hardware and/or software for communicating with other routers to gather and store routing information in a label information base (LIB).

Figure 6:
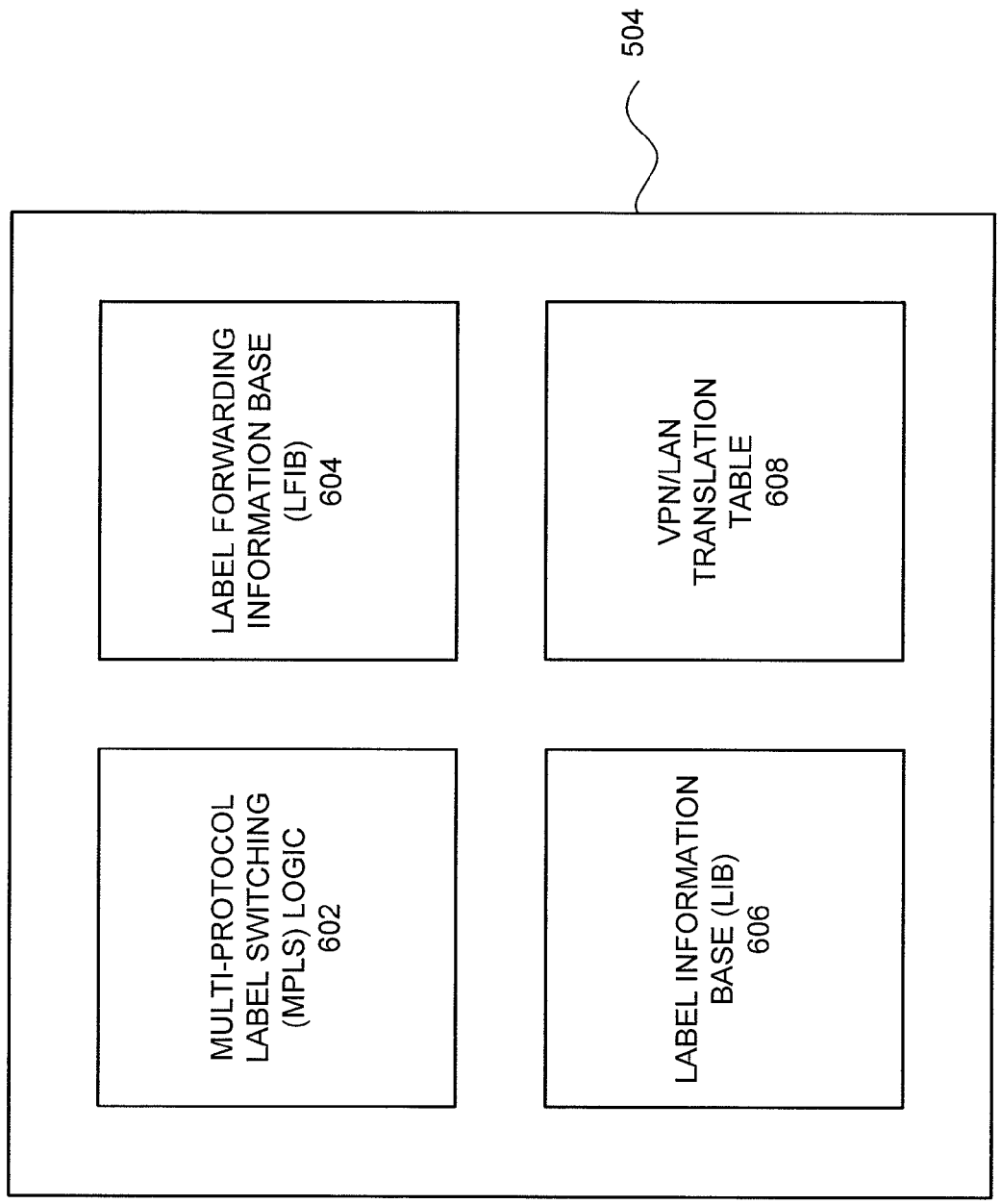
FIG. 6 is an exemplary functional block diagram of forwarding logic in a provider edge router.

FIG. 6 is an exemplary functional block diagram of forwarding logic 506. As shown, forwarding logic 506 may include MPLS logic 602, a label forwarding information base (LFIB) 604, a LIB 606, and a VPN/VLAN translation table 608. MPLS logic 602 may include hardware and/or software for examining the header of an incoming packet and for sending the packet to the proper output port, based on the header information and path/routing information stored in LFIB 604, LIB 606, or translation table 608. LFIB 604, LIB 606, and/or translation table 608 may include a table and/or a database of network paths, e.g., Label Switched Paths (LSPs), and/or other routing information. LFIB 604 may contain more frequently used portions of LIB 606 and may be smaller than LIB 606. Translation table 608 may be used for forwarding packets to an application accelerator.

MPLS logic 602 may perform different routing procedures, depending on whether its host router is operating as a PE router or a PS router. The host router may operate as a PE router or a PS router at different times, depending on an incoming packet and its network configuration. If the host router operates as PE router 214, MPLS logic 602 may convert a packet that enters network 110 into a MPLS packet, by adding a MPLS header to the packet. Conversely, MPLS logic 602 may convert a MPLS packet to a native packet by stripping away its MPLS header.

Figure 7:
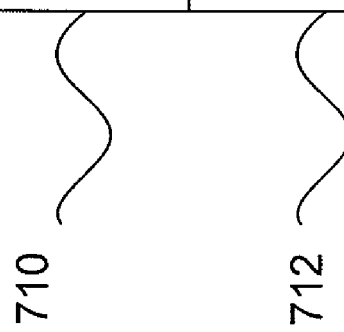
FIG. 7 is a block diagram of an exemplary translation table.

FIG. 7 is a block diagram of exemplary VPN/LAN translation table 608. Translation table 608 may identify LANs that may be used for corresponding VPNs for data passing between, such as PE router 214 and application complex 222. Translation table 608 may include a VPN field 702 and a LAN field 704. As described below, different, or fewer fields other than those shown in FIG. 7 are possible.

VPN field 702 may identify a group of VPNs. For example, in exemplary table 608, record 710 specifies VPN 106 for the first customer and record 712 specifies VPN 156 for the second customer. LAN field 704 indicates the LAN on which traffic for the corresponding VPN may be carried. For example, in exemplary table 608, LAN field 704 indicates that traffic from VPN 106 (such as flow 108 for the first customer) may be carried on LAN A. LAN field 704 also indicates that traffic from VPN 156 (such as flow 158 for the second customer) may be carried on LAN B. When PE router 214 receives a packet over network 110 from a VPN specified in VPN field 702, it may forward the packet over the LAN specified in the corresponding LAN field 704 to application complex 222. Thus, when PE router 214 receives a packet from the VPN 106, it may forward the packet over LAN A to application complex 222. When PE router 214 receives a packet from the VPN 156, it may forward the packet over VLAN B to application complex 222. In this embodiment, traffic in one VPN may be kept separate (logically and/or physically) from traffic in a different VPN.

As mentioned above, different, or fewer fields other than those shown in FIG. 7 are possible. In one embodiment, LAN field 704 may specify a VLAN. Further, translation table 608 may include a field for a physical port. Thus, in addition to forwarding a received packet on a particular LAN identified in LAN field 704 (depending on the identity of the VPN), PE router 214 may also forward a received packet on a particular physical port identified in a port field (not shown).

Translation table 608 may be stored in memory 404 and/or forwarding logic 506 of PE router 214. As described below, translation table 608 may also be stored in the memory of an application complex, such as application complex 222 or 224.

Figure 8:
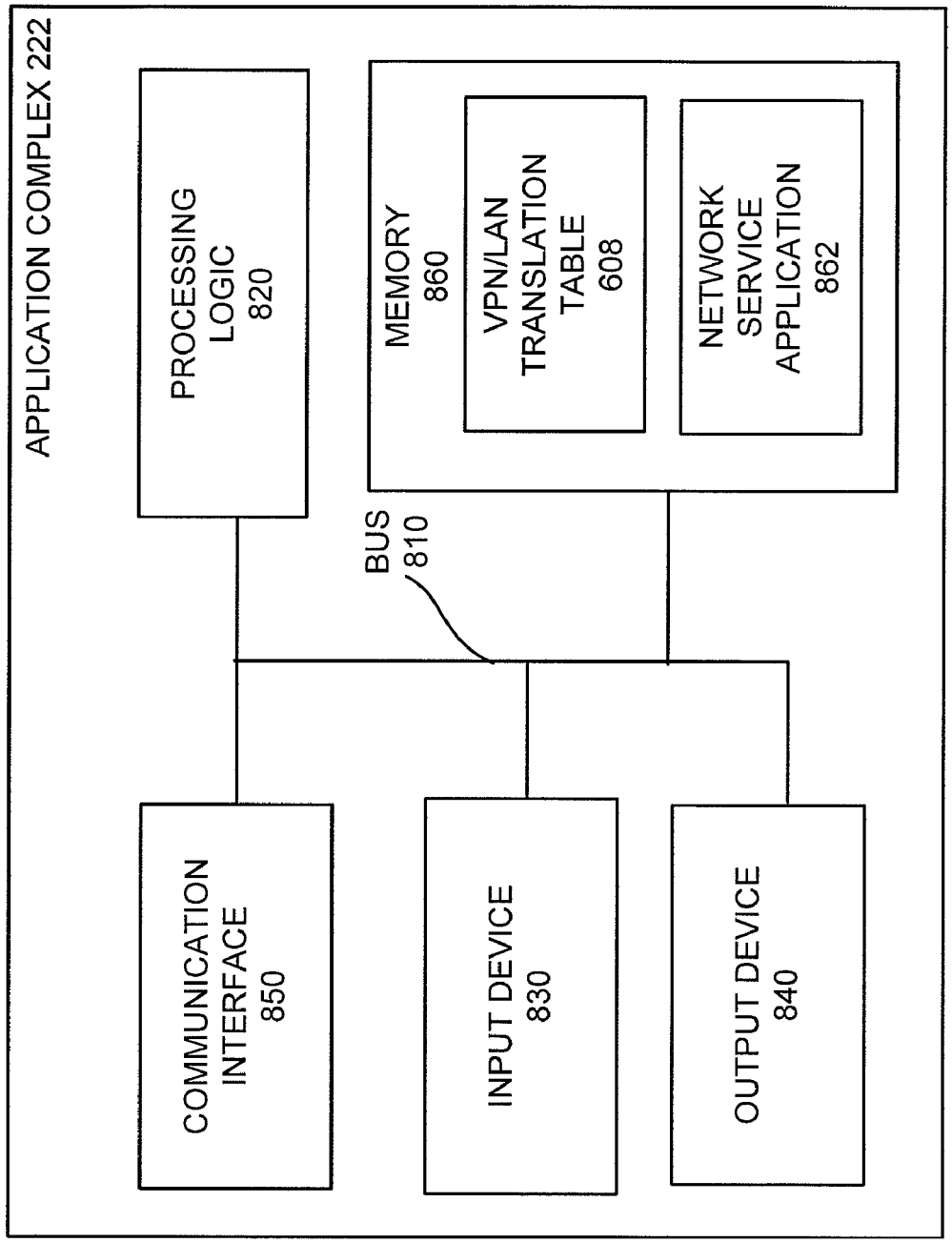
FIG. 8 is a block diagram of exemplary components of an application complex.

FIG. 8 is a block diagram of exemplary components of application complex 222. Application complex 222 may include a bus 810, processing logic 820, an input device 830, an output device 840, a communication interface 850, and a memory 860. Memory 860 may include a network service application 862 and translation table 608. Application complex 222 may include other components (not shown) that aid in receiving, transmitting, and/or processing data. Moreover, other configurations of components in application complex 222 are possible. Further, one or more components of application complex 222 may be remotely located from each other.

Bus 810 may include a path that permits communication among the components of application complex 222. Processing logic 820 may include any type of processor or microprocessor (or groups of processors or microprocessors) that interprets and executes instructions. In other embodiments, processing logic 820 may include one or more ASICs, FPGAs, or the like.

Input device 830 may include a device that permits a user to input information into application complex 222, such as a keyboard, a keypad, a mouse, a pen, a microphone, one or more biometric mechanisms, or the like. Output device 840 may include a device that outputs information to the user, such as a display, a printer, a speaker, etc.

Communication interface 850 may include any transceiver-like mechanism that enables application complex 222 to communicate with other devices and/or systems. Memory 860 may include a RAM or another type of dynamic storage device that may store information and instructions for execution by processing logic 820; a ROM device or another type of static storage device that may store static information and instructions for use by processing logic 820; and/or some other type of magnetic or optical recording medium and its corresponding drive, e.g., a HDD, for storing information and/or instructions.

Memory 860 may include data structures or software programs to control operation of application complex 222 and its components. As mentioned above, memory 860 may store VPN/LAN translation table 608. Further, memory 860 may store network service application 862. In one embodiment, network service application 862 may accelerate applications running in nodes 102, 104, 152, and/or 154. Memory 860 may store applications other than network service application 862.

Application complex 222 may perform certain operations, as described in detail below. Application complex 222 may perform these operations in response to processing logic 820 executing software instructions contained in a computer-readable medium, such as memory 860. A computer-readable medium may be defined as a physical or logical memory device and/or carrier wave. The software instructions may be read into memory 860 from another computer-readable medium or from another device via communication interface 850. The software instructions contained in memory 860 may cause processing logic 820 to perform processes that are described below.

Network service application 862 may access translation table 608 to determine with which VPN received packets are associated based on the LAN on which the packets were received. For example, when application complex 222 receives a packet from a LAN specified in field 704, network service application 862 may associate the packet with the corresponding VPN specified in VPN field 702. In the exemplary embodiment of FIG. 7, when application complex 222 receives a packet over LAN A, network service application 862 may associate the packet with VPN 106 (e.g., the first customer). When application complex 222 receives a packet over LAN B, network service application 862 may associate the packet with VPN 156 (e.g., the second customer). Application complex 222 may identify the VPN based on the LAN and/or port of a received packet if, for example, translation table 608 includes a port field (not shown).

Figure 9:
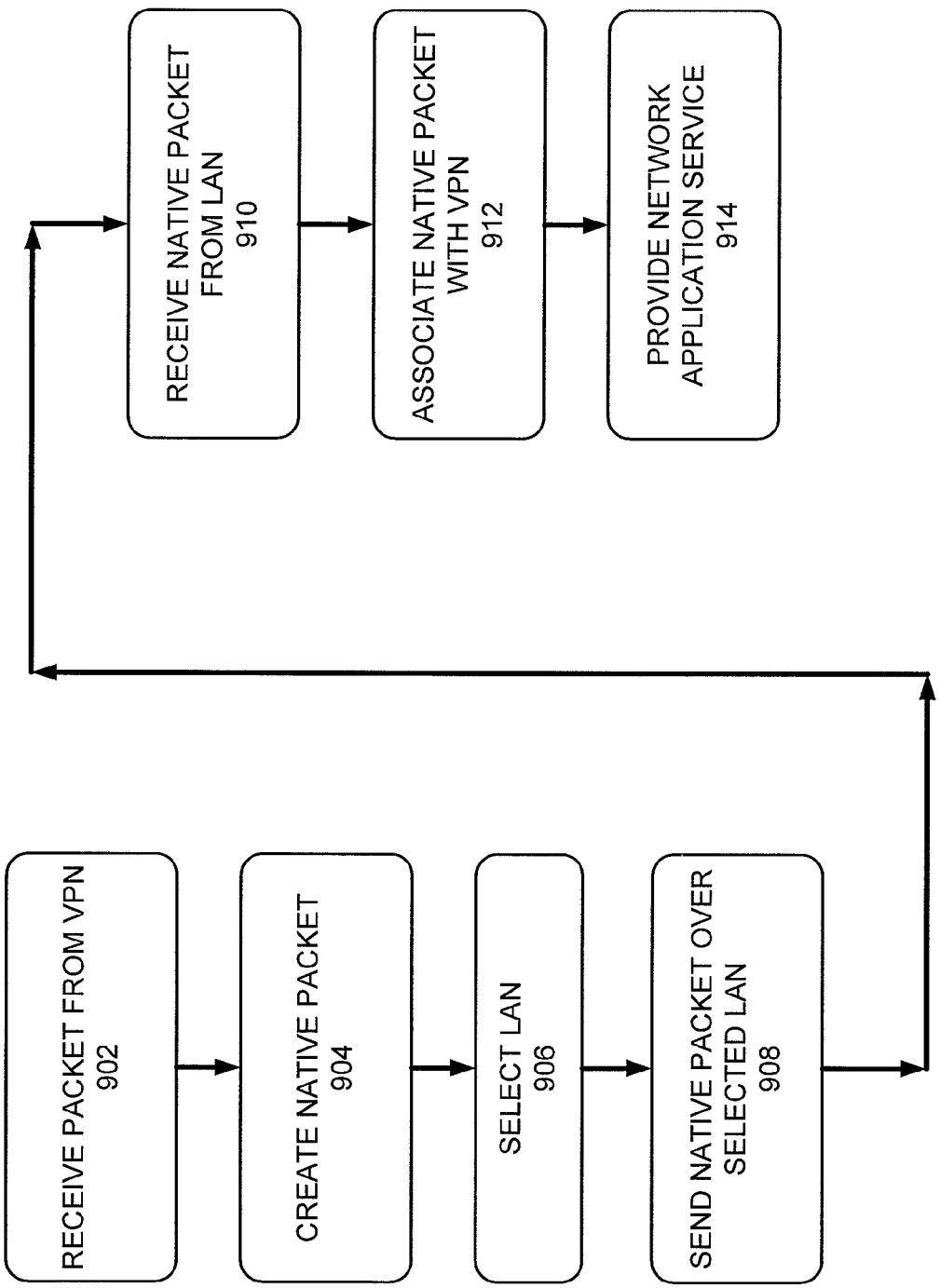
FIGS. 9 and 10 are flow diagrams of exemplary processes for providing network service applications in a virtual private network environment.

FIG. 9 is a flow diagram of an exemplary process 900 for providing network service applications in a VPN environment. Process 900 is described with respect to environment 100 of FIGS. 1 and 2, the coupling between PE router 214 and application complex 222 of FIG. 3, and VPN/LAN translation table 608 of FIG. 6.

Process 900 may begin when an application in a node included on a VPN is executing an application that sends a packet to a remote node. Referring to FIG. 1, an employee of the first company may be running a payroll application in node 102 that may send a packet, such as an IP packet, to an employee database running in node 104. The packet may be encapsulated as an MPLS packet by PE router 210 for transport in VPN 106 as part of flow 108 through network 110. A packet may be received (block 902) in a PE router. For example, the packet sent from node 102 to node 104 may be received as an MPLS packet by PE router 214. A native packet may be created (block 904). The MPLS packet may be converted from an MPLS packet to a native packet by PE router 214. The MPLS packet may be converted, for example, to a native packet, e.g., a native IP packet, by stripping off the MPLS label.

A LAN may be selected (block 906). Translation table 608 stored in PE router 214 may be queried. Because the packet came from the first customer over VPN 106, LAN A may be selected pursuant to record 710 in table 608 (shown in FIG. 7). The native packet may be sent over the selected LAN (block 908). In the current example, the native packet may be sent over LAN A as part of flow 108 depicted in FIG. 3, for example. If the packet came from the second customer over VPN 156, LAN B may be selected pursuant to record 712 in table 608.

The forwarded native packet may be received by a destination via the LAN (block 910). In the current example, the native packet, e.g., an IP packet, may be received by application complex 222 via LAN A as part of flow 108, depicted in FIG. 3. The native packet may be associated with a VPN based on the LAN on which the native packet was received (block 912). In the current example, translation table 608 stored in application complex 222 may be queried. In this example, because the packet came from LAN A, application complex 222 may associate the received native packet with the first customer using VPN 106. If the packet came from LAN B, application complex 222 may associate the received native packet with the second customer using VPN 156. The network service application associated with the received native packet, e.g., flow 108, may provide a network service (block 914). Application complex 222, for example, may accelerate applications by caching data, responding to messages, etc. For example, after sending a message to node 104, node 102 may wait for an acknowledgment message (ACK) from node 104. Application complex 222 may intercept the message from node 102 to node 104 and application complex 222 (instead of node 104) may send the ACK message to node 102. Because application complex 222 may be geographically closer to node 102 than node 104, node 102 may not have to wait as long for the ACK message, thus speeding up the client application.

Although the nodes on VPN 106 and VPN 156 may include overlapping native network addresses, such as overlapping IP addresses, application complex 222 (or 224) may logically and/or physically separate packets from the two VPNs.

Process 900 may be performed in PE router 214 by processor 402 and/or routing logic 504 using VPN/LAN translation table 608. Process 900 may also be performed in application complex 222 by processing logic 820 running, for example, an application acceleration program. In one embodiment, PE router 214 may implement blocks 902 through 908 and application complex 222 may implement blocks 908 through 914.

Figure 10:
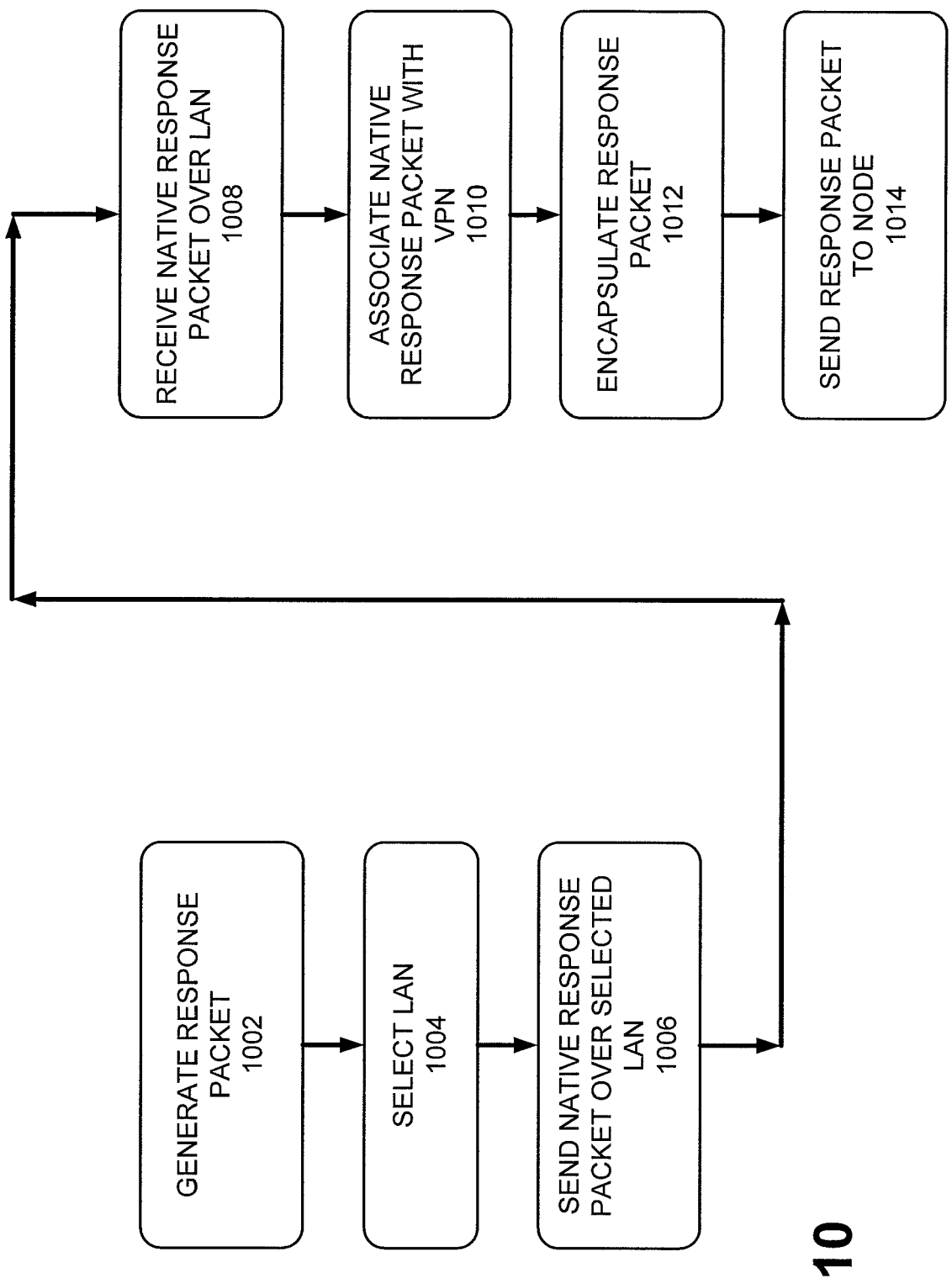

FIG. 10 is a flow diagram of an exemplary process 1000 for providing a network service application in a VPN environment. Process 1000 is described with respect to environment 100 of FIGS. 1 and 2, the coupling between PE router 214 and application complex 222 of FIG. 3, and VPN/LAN translation table 608 of FIG. 6.

Process 1000 may begin with the generation of a response packet (block 1002). The response packet may be associated with application complex 222 providing network application services to a packet or a flow of packets. For example, application complex 222 may send an ACK packet to node 102 in response to the native packet received with respect to FIG. 9 above. A LAN may be selected (block 1004). In the current example, translation table 608 stored in application complex 222 may be queried. Because the response packet is associated with the first customer and VPN 106, LAN A may be selected pursuant to entry 710 in table 608. Alternatively, the response packet may be sent on the LAN from which the original packet was received. A native response packet may be sent over the selected LAN (block 1006). In the current example, the native response packet may be sent on LAN A. When sending the native response packet, application complex 222 may use the native address space of VPN 106.

The native response packet may be received (block 1008). In the current example, the native response packet may be received by PE router 214. A native response packet may be associated with a VPN (block 1010). In the current example, translation table 608 stored in PE router 214 may be queried. Because the packet was received on LAN A, the native packet may be associated with the first customer and VPN 106. The response packet may be encapsulated (block 1012). An MPLS header may be attached to the packet, for example, for forwarding in the selected VPN. The response packet may be sent to the appropriate node (block 1014). In this example, the MPLS packet may be forwarded to PE 210 where it is converted to a native response packet and forwarded to node 102 through CE router 202. Thus, even though packets received by PE router 214 from application complex 222 may be intended for different VPNs with overlapping native network addresses, PE router 214 may keep such packets logically and/or physically separate.

Application complex 222 may generate other types of response packets, such as packets sent to node 104 instead of or in addition to packets sent to node 102.

Process 1000 may be performed in PE router 214 by processor 402 and/or routing logic 504 using VPN/LAN translation table 608. Process 1000 may also be performed in application complex 222 by processing logic 820 running, for example, network service application program 862. In one embodiment, application complex 222 may implement blocks 1002 through 1006 and PE router 214 may implement blocks 1008 through 1014.

In the preceding specification, various preferred embodiments have been described with reference to the accompanying drawings. It will, however, be evident that various modifications and changes may be made thereto, and additional embodiments may be implemented, without departing from the broader scope as set forth in the claims that follow. The specification and drawings are accordingly to be regarded in an illustrative rather than restrictive sense.

While series of blocks have been described above, such as in FIGS. 9 and 10, the order of the blocks may differ in other implementations. Moreover, non-dependent acts may be performed in parallel.

It will be apparent that aspects of the embodiments, as described above, may be implemented in many different forms of software, firmware, and hardware in the implementations illustrated in the figures. The actual software code or specialized control hardware used to implement these embodiments is not limiting. Thus, the operation and behavior of the embodiments are described without reference to the specific software code—it being understood that software and control hardware may be designed to implement the embodiments based on the description herein.

Further, certain portions of embodiments may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    intercepting, from a first node, a first packet at a network application server via a first local area network (LAN), wherein the first packet is destined for a second node other than the network application server;
    intercepting, from a third node, a second packet at the network application server via a second LAN, wherein the second packet is destined for a fourth node other than the network application server;
    associating the first packet with a first virtual private network (VPN) based on receiving the first packet via the first LAN, wherein the first node is coupled to the second node through the first VPN;
    associating the second packet with a second VPN based on reception of the second packet via the second LAN, wherein the third node is coupled to the fourth node through the second VPN and wherein the first VPN and the second VPN include overlapping network address spaces; and
    providing an application-layer service, at the network application server, requested by the first node of the second node and associated with the first packet that is associated with the first VPN or requested by the third node of the fourth node and associated with the second packet that is associated with the second VPN.

2. The method of claim 1, wherein providing the application-layer service further comprises:

providing an application-layer service, at the network application server, associated with the first packet; and
providing an application-layer service, at the network application server, associated with the second packet.

3. The method of claim 2, wherein the first LAN includes a virtual LAN and the second LAN includes a virtual LAN.

4. The method of claim 1, further comprising
sending a first response packet to the first node through the first VPN via the first LAN, wherein the first response packet is in response to the application-layer service requested by the first node of the second node and in response to the first packet; and
sending a second response packet to the third node through the second VPN via the second LAN, wherein the second response packet is in response to the application-layer service requested by the third node of the fourth node and in response to the second packet.

5. The method of claim 4,
wherein the network application server is geographically closer to the first node than the first node is to the second node; and
wherein the application-layer service requested by the first node of the second node includes a database service and the first response packet is an acknowledgment packet of a request of the database service.

6. The method of claim 1,
wherein the first packet includes a network destination address identifying the second node as the destination of the first packet and the second packet includes a network destination address identifying the fourth node as the destination of the second packet; and
wherein receiving the first packet at the network application server includes intercepting the first packet at the network application server and wherein receiving the second packet at the network application server includes intercepting the second packet at the network application server.

7. The method of claim 6,
wherein the first packet is an internet protocol (IP) packet including a first header, wherein the first header includes the network destination address identifying the second node as the destination of the first packet, and wherein the network destination address identifying the second node is an IP address; and
wherein the second packet is an IP packet including a second header, wherein the second header includes the network destination address identifying the fourth node as the destination of the second packet, and wherein the network destination address identifying the fourth node is an IP address.

8. A network device comprising:
a communications interface to:
intercept, from a first node, a first packet at the network device via a first local area network (LAN), wherein the first node is coupled to a second node through a first virtual private network (VPN), and wherein the first packet is destined for the second node other than the network device, and
intercept, from a third node, a second packet at the network device via a second LAN, wherein the third node is coupled to a fourth node through a second VPN, and wherein the second packet is destined for the fourth node other than the network device; and
a processor to
associate the first packet with the first VPN based on receiving the first packet via the first LAN,
associate the second packet with the second VPN based on reception of the second packet via the second LAN,
provide an application-layer service, associated with the first packet associated with the first VPN, to the first node that the first node requested of the second node; and
provide an application-layer service, associated with the second packet associated with the second VPN, to the third node that the third node requested of the fourth node.

9. The network device of claim 8, wherein the first VPN and the second VPN include overlapping network addresses spaces.

10. The network device of claim 9, wherein the network-layer destination address of the first packet identifies the second node and wherein the network-layer destination address of the second packet identifies the fourth node.

11. The network device of claim 10, wherein the network device is geographically closer to the first node than the first node is to the second node.

12. The network device of claim 10, wherein the communications interface is further configured to:
send a first response packet to the first node through the first VPN via the first LAN, wherein the first response packet is in response to the application-layer service requested by the first node of the second node; and
send a second response packet to the third node through the second VPN via the second LAN, wherein the second response packet is in response to the application-layer service requested by the third node of the fourth node.

13. The network device of claim 9, wherein the first LAN includes a virtual LAN and the second LAN includes a virtual LAN.

14. The network device of claim 8,
wherein the first packet includes a network destination address identifying the second node as the destination of the first packet and the second packet includes a network destination address identifying the fourth node as the destination of the second packet; and
wherein the communications interface intercepts the first packet and intercepts the second packet.

15. The network device of claim 14,
wherein the first packet is an internet protocol (IP) packet including a first header, wherein the first header includes the network destination address identifying the second node as the destination of the first packet, and wherein the network destination address identifying the second node is an IP address; and
wherein the second packet is an IP packet including a second header, wherein the second header includes the network destination address identifying the fourth node as the destination of the second packet, and wherein the network destination address identifying the fourth node is an IP address.

16. A method comprising:
intercepting, at a network application server, a plurality of packets from source nodes over a plurality of local area networks (LANs);
associating each of the plurality of packets with one of a plurality of virtual private networks (VPNs) based on the LAN via which each of the plurality of packets was received, wherein the plurality of VPNs include overlapping network address spaces, wherein at least two of the plurality of VPNs are each associated with a different one of the plurality of packets received on a different one of the plurality of LANs, and wherein each of the plurality of packets is destined to one or more destination nodes, other than the network application server, in the corresponding VPN; and providing an application-layer service, at the network application server, requested by the source nodes of the destination nodes, the application-layer service being associated with the plurality of packets that are associated with the plurality of VPNs.

17. The method of claim 16, wherein providing an application-layer service further comprises accelerating, at the network application server, a plurality of applications associated with the plurality of packets.

18. The method of claim 16, wherein the plurality of packets include a first packet and a second packet, and wherein the first packet and the second packet each include the same source network address or source Internet protocol (IP) address.

19. The method of claim 18, wherein the plurality of LANs are virtual LANs (VLANs).

20. The method of claim 16, wherein receiving the plurality of packets includes receiving each of the plurality of packets through one of a plurality of physical ports.

21. The method of claim 16,
wherein the plurality of VPNs includes a first VPN and a second VPN, the plurality of LANs includes a first LAN and a second LAN, and the plurality of packets includes a first packet and a second packet;
wherein receiving the plurality of packets over the plurality of LANs includes:
    receiving a first multi-protocol label switching (MPLS) packet from the first VPN;
    receiving a second MPLS packet from the second VPN;
    converting the first MPLS packet and the second MPLS packet into the first packet and the second packet, respectively;
    sending the first packet via the first LAN to the network application server; and
    sending the second packet via the second LAN to the network application server.

22. An apparatus comprising:
means for intercepting, from a first node, a first packet at a network application server from a first local area network (LAN), wherein the first packet is destined for a second node other than the network application server;
means for intercepting, from a third node, a second packet at the network application server via a second LAN, wherein the second packet is destined for a fourth node other than the network application server;
means for associating the first packet with a first virtual private network (VPN) based on receiving the first packet via the first LAN, wherein the first node is coupled to the second node through the first VPN;
means for associating the second packet with a second VPN based on reception of the second packet via the second LAN, wherein the third node is coupled to the fourth node through the second VPN and wherein the first VPN and the second VPN include overlapping network address spaces; and
means for providing an application-layer service, at the network application server, requested by the first node of the second node and associated with the first packet associated with the first VPN, or requested by the third node of the fourth node and associated with the second packet associated with the second VPN.

23. The apparatus of claim 22, further comprising:
means for providing an application-layer service, at the network application server, associated with the first packet, and means for providing an application-layer service, at the network application server, associated with the second packet.

24. The apparatus of claim 23,
wherein the means for providing the application-layer service associated with the first packet includes means for accelerating an application, running in the first node, that requests a service in the second node associated with the first packet; and
wherein the means for providing the application-layer service associated with the second packet includes means for accelerating an application, running in the third node, that requests a service in the fourth node associated with the second packet.

25. The apparatus of claim 24, wherein the network application server is geographically closer to the first node than the first node is to the second node.

* * * * *